Aug. 2, 1966  W. J. ADAMS, JR  3,263,763
VARIABLE SPEED AND STEER CONTROL
Filed Jan. 24, 1964  5 Sheets-Sheet 1
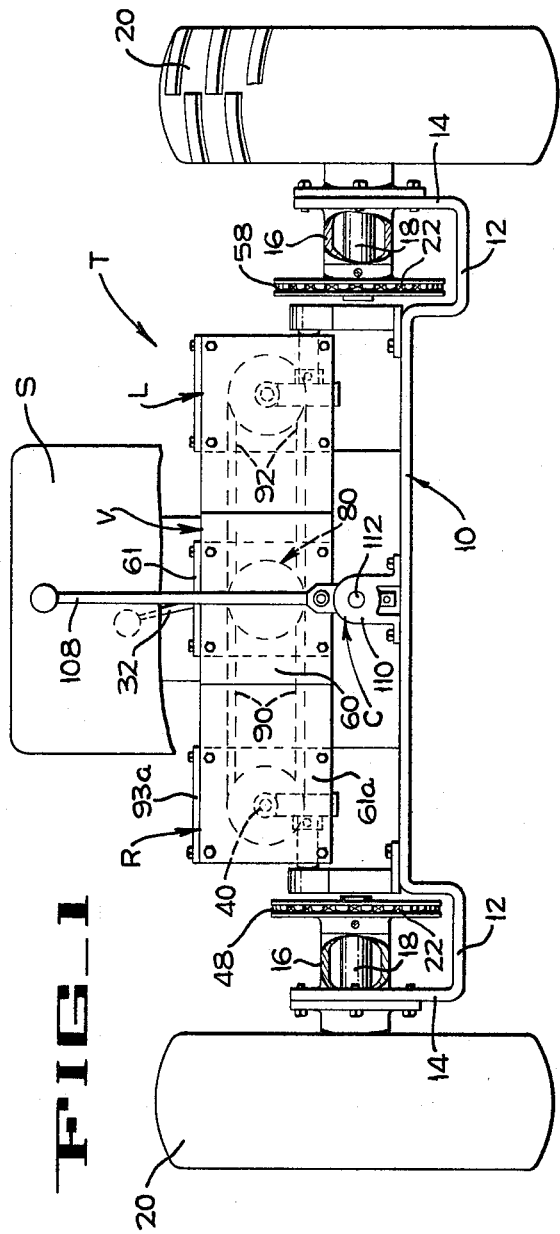
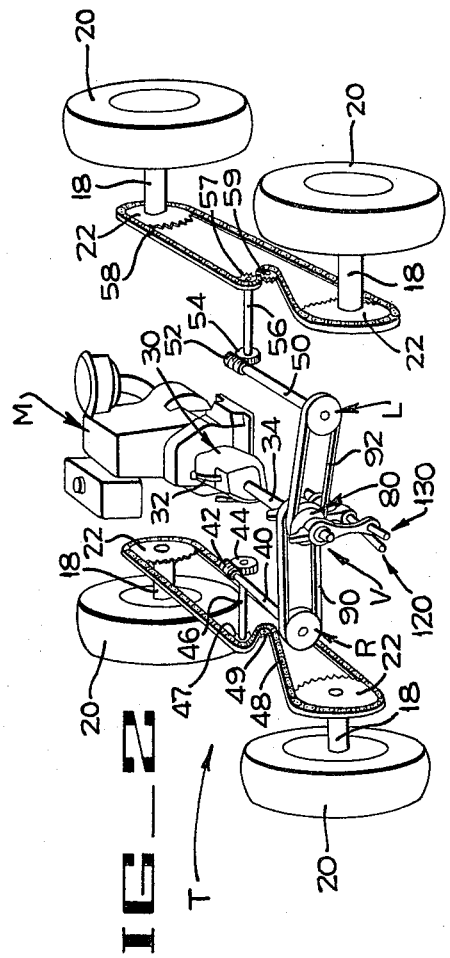
INVENTOR
WILLIAM J. ADAMS, JR.
BY *Hans G. Hoffmeister*
ATTORNEY

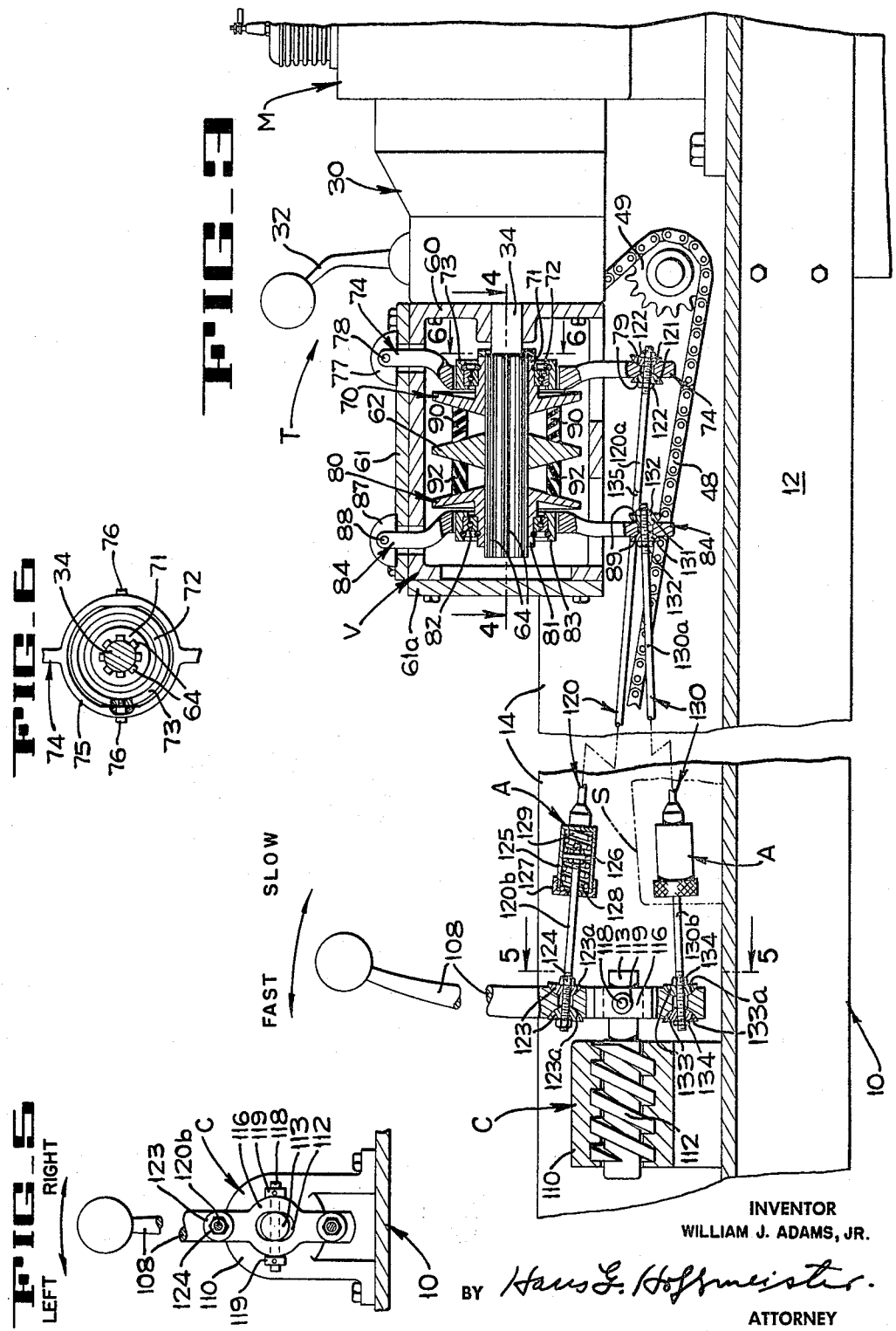

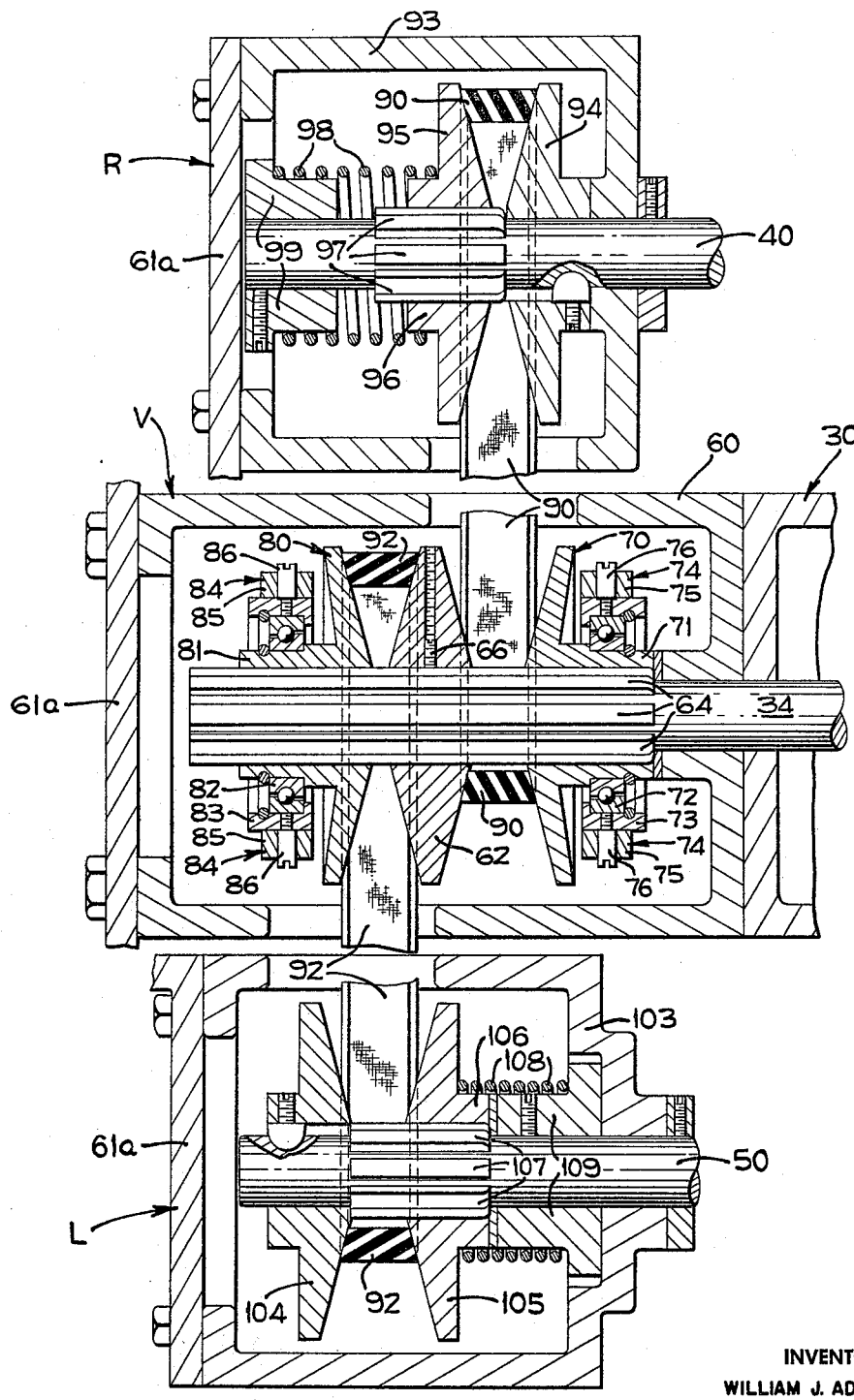
FIG_4

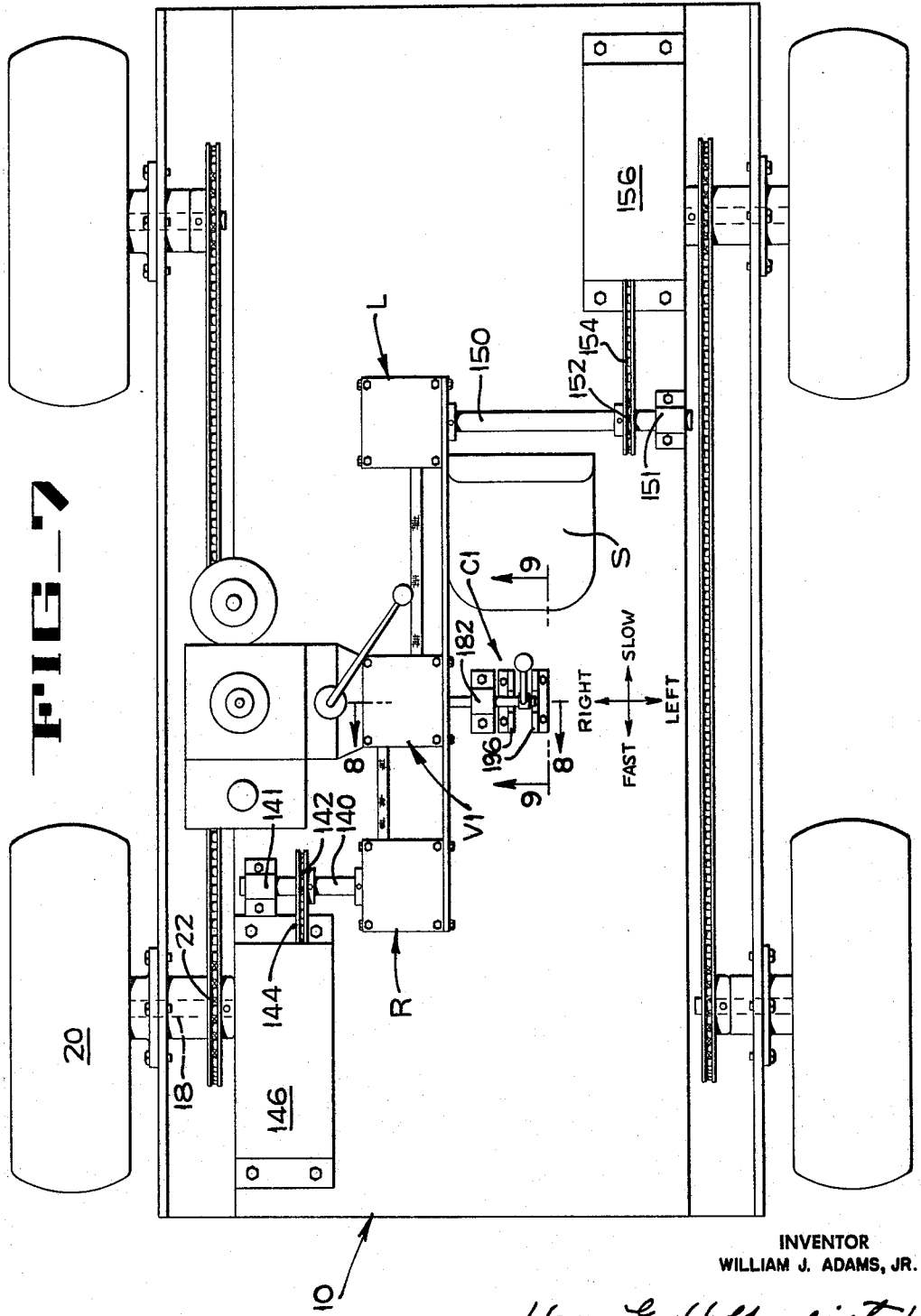

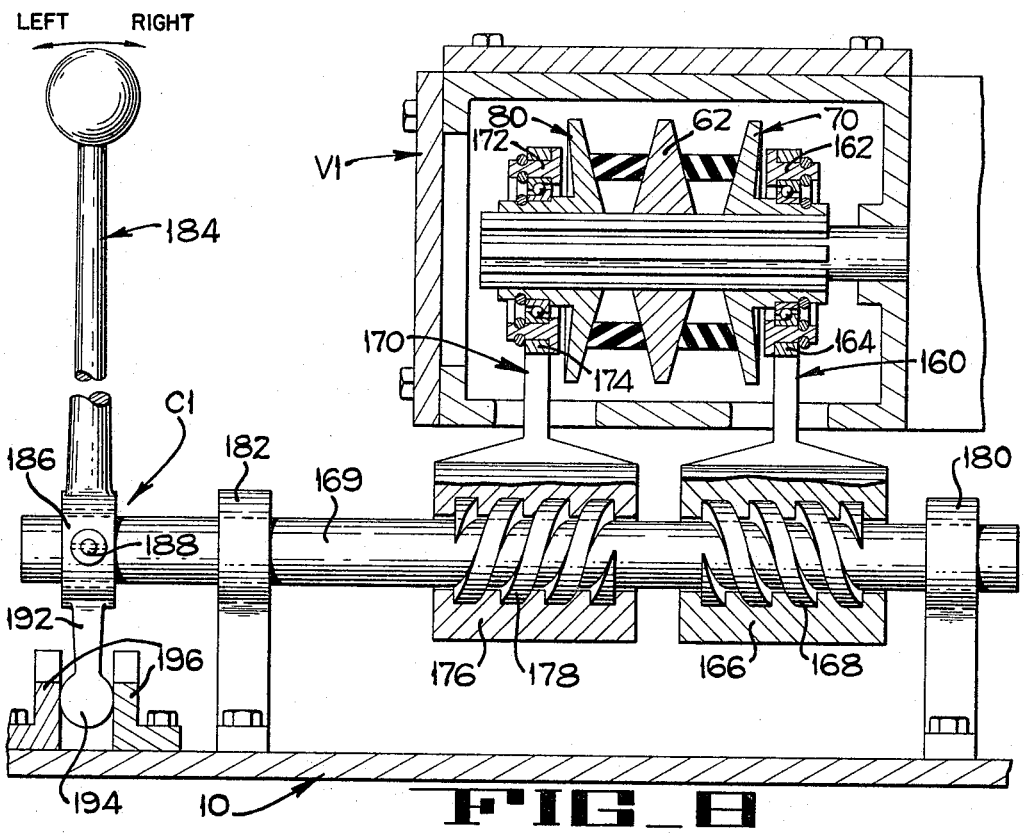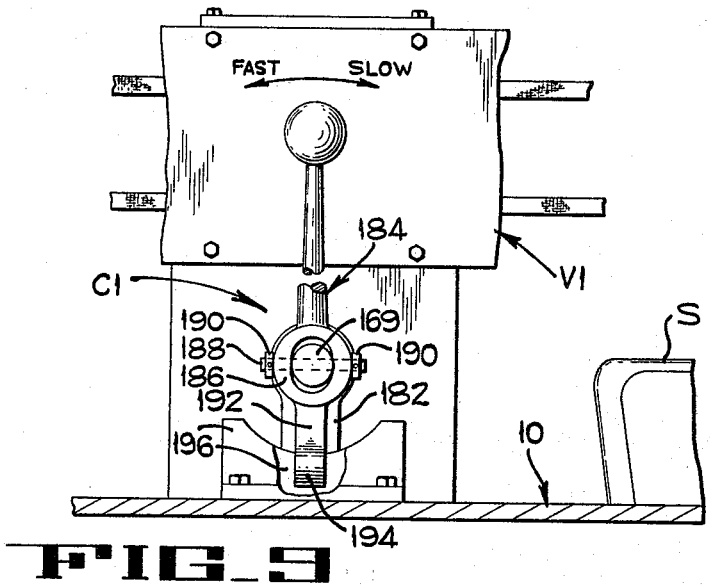

United States Patent Office 3,263,763
Patented August 2, 1966

3,263,763
VARIABLE SPEED AND STEER CONTROL
William J. Adams, Jr., San Jose, Calif., assignor to FMC Corporation, San Jose, Calif., a corporation of Delaware
Filed Jan. 24, 1964, Ser. No. 339,965
11 Claims. (Cl. 180—6.2)

This invention relates to vehicles, and to driving gear or transmissions for vehicles, and more particularly to vehicles which are steered by driving a wheel or wheels on one side of the vehicle at a speed that is different from the speed of the corresponding wheel or wheels on the other side of the vehicle.

It is an object of the invention to provide an improved variable speed and steer control for vehicles of the type described.

Another object of the invention is to provide a variable speed and steer control of the type referred to, which can be operated by a single control lever or joystick.

A further object of the invention is to provide a single lever or joystick control of the type described, which operates in a manner that is psychologically meaningful to the operator. Stated differently, in the single lever, joystick control of the present invention, pushing the control lever forward speeds the vehicle up, retracting it slows the vehicle down, moving the control lever to the right causes the vehicle to turn to the right, and moving the lever to the left causes the vehicle to turn to the left.

Another object of the invention is to provide a single lever or joystick control of the type described, wherein the changes in speed, or the sharpness of turn, is proportional to the corresponding displacement of the joystick from its neutral position.

Still another object of the present invention is to provide a control of the type described, wherein the control lever or joystick can be positioned to provide the intended results when the vehicle is not moving.

Another object of the present invention is to provide a variable speed transmission of the V-belt type which can be operated by a single control lever, and which transmission drives two output shafts. In accordance with the present invention, motion of the control lever in one plane varies the speed of both transmission output shafts equally and simultaneously, whereas motion of the control lever in a plane at 90° to the aforesaid plane causes the speed of one output shaft to increase and the speed of the other output shaft to decrease.

The manner in which these and other objects of the present invention may be accomplished by those skilled in the art will be apparent from the following detailed description of the invention.

In the drawings:

FIGURE 1 is a front elevation of a four-wheel drive tractor embodying the invention.

FIGURE 2 is a schematic perspective of the tractor, which includes only the drive units thereof and the motor.

FIGURE 3 is a vertical section taken at the midplane of the tractor, taken through the main variable speed transmission unit.

FIGURE 4 is a section through the main variable speed transmission unit, taken on lines 4—4 of FIGURE 3.

FIGURE 5 is a fragmentary section at the control lever, taken on lines 5—5 of FIGURE 3.

FIGURE 6 is a fragmentary section at a transmission unit shift lever, taken on lines 6—6 of FIGURE 3.

FIGURE 7 is a plan view of a tractor having a modified driving arrangement.

FIGURE 8 is a vertical section through the main driving unit, taken on lines 8—8 of FIGURE 7.

FIGURE 9 is a fragmentary side elevation of the control unit, taken on lines 9—9 of FIGURE 7.

Referring to FIGURES 1 and 2, a four wheel drive, rubber tired tractor T is illustrated as embodying the invention. Although the tractor to be described in detail is a four-wheel drive tractor, having rubber tired road wheels, it is to be understood that each of the right and left set of two front wheels may also be in the form of track laying drive wheels, without affecting the mode of operation of the invention. In either case, the vehicle embodying the invention can be characterized as a drive wheel steered vehicle.

As illustrated, the tractor T has a simple unitary metal frame 10 having channeled side portions 12, with upwardly projecting side flanges 14 provided for mounting the wheels, or for mounting the driving wheels or pulleys for track laying vehicles.

As best seen in FIGURE 1, tubular axle housings 16 are bolted to the frame side flanges 14, and mounted within each housing is a stub axle 18. Each stub axle 18 is retained in its housing 16 by means of suitable bearings and retainers, the details of which form no part of the invention, and so are not illustrated. Mounted upon each stub axle 18 is a wheel and rubber tire assembly indicated generally at 20. As mentioned previously, in case the tractor T is of the track laying type, only the front pair of wheels need be the driven wheels, for moving the track in the conventional manner. In the four wheel drive vehicle under description, each axle 18 has a driving sprocket 22 mounted on the inner end thereof, which sprocket is driven in a manner to be described in detail presently.

The drive train of a four wheel drive vehicle embodying the invention will now be described. As illustrated the tractor T, is driven by an internal combustion engine M, which is bolted to the frame, and the drive shaft end of the engine mounts a combined reverse gear and clutch assembly 30, which is operated by a control lever 32. The details of the reverse gear and clutch assembly 30 form no part of the invention, and hence are not illustrated. Extending from the reverse gear clutch assembly 30 is a drive or power shaft 34, which drives the vehicle.

The drive or power shaft 34 drives into a main variable speed and steer control unit V, which in turn operates a right hand variable speed driven or follower unit R, and a left hand unit L. The main variable speed and steer control unit V is controlled by a single lever or joystick control assembly C, best seen in FIGURES 3 and 5. A seat S is provided for the operator, (FIGURE 1), so that the control lever assembly C is in front of the operator. The operator can also reach the control lever 32, for the reverse gear and clutch unit 30.

As seen in FIGURES 2 and 4, a drive shaft 40 projects rearwardly from the right hand driven or follower unit R and terminates in a worm 42. The worm 42 drives a worm wheel 44 mounted on the inner end of a countershaft 46. The outer end of the countershaft 46 mounts a sprocket pinion 47, which drives a chain 48. An idler sprocket 49, FIGURE 2, is provided, although the details of its construction and mounting are not important to the invention. The drive train parts for the left wheels of the vehicle have been assigned reference characters 50 to 59, and correspond to parts 40 to 49 just described, so that a detailed description thereof is unnecessary.

The main variable speed and steer control unit V will now be described in detail. The unit is contained in a housing 60, having a removable cover plate 61, for access to the V-belts. The rear of the housing 60 is bolted to the reverse gear and clutch unit 30 mounted on the motor. The front of the unit V is closed by a cover plate 61a, which also supports the follower or driven units R and L as best seen in FIGURES 1 and 4. As seen in FIGURES 3 and 4, the unit V includes a fixed dual pulley section 62, which has a splined hub that receives splines 64 formed on the power shaft 34. The dual pulley section 62 is secured to the shaft 34 by a set screw 66 (FIGURE 4).

The unit V also includes a movable pulley section 70, which has a splined hub 71 that is slidably mounted on the splines 64 of the power shaft 34, and which drives the right hand follower or driven unit R. The hub 71 of the pulley section 70 mounts a combined radial and axial thrust bearing 72, which bearing is retained on the hub 71 by a snap ring. A shift collar 73 is retained on the outer race of the bearing 72 by another snap ring. The shift collar 73 and the bearing and pulley section 70 are shifted by a shift lever, indicated generally at 74. As best seen in FIGURES 3 and 6, the shift lever 74 is formed with a yoke portion 75, that surrounds the shift collar 73. As best seen in FIGURE 6, pins 76 are threaded into the shift collar 73, for mounting the yoke 75 of the shift lever 74 on the shift collar.

The upper end of the shift lever 74 is pivotally mounted on the cover plate 61 by means of ears 77, only one of which appears in FIGURE 3, and a pin 78 passing through the shift lever and the ears. In order to operate the shift lever, the lower end thereof is formed with opposed semispherical sockets 79, for reception of a control link, as will be explained presently.

The left side follower or driven assembly L is operated by a shiftable pulley and shift lever assembly indicated by reference characters 80–89, which reference characters indicate parts corresponding to those of the right hand shift lever assembly, and hence are not described in detail. A reinforced V-belt 90 connects the variable speed unit V with the right hand following unit R, and a similar belt 92 connects the variable speed unit V with the left hand follower unit L, these belts being best seen in FIGURES 1 and 4.

The right hand follower or driven unit R will now be described in detail, particularly with reference to FIGURE 4. The unit is mounted in a housing 93, having a removable cover plate 93a for access to the V-belt 90. The cover plate 93a appears only in FIGURE 1 of the drawings. The unit R includes a fixed pulley section 94, which is keyed to the right hand output drive shaft 40, previously described. Facing the fixed pulley section 94, is a movable pulley section 95, that has a splined hub 96 for sliding on splines 97 formed on the output or drive shaft 40. The movable pulley section 95 is urged toward the fixed pulley section 94 by a follower spring 98, which spring is guided by a spring guide 99 mounted on the shaft 40.

The left hand follower unit L is mounted in a housing 103, and includes a fixed pulley section 104 that is keyed to the output shaft 50, for driving the left hand driving wheels. The left hand follower unit L also includes a movable pulley section 105, that has a splined hub 106, which hub slides on splines 107 formed on the output shaft 50. The movable pulley section 105 is urged towards the fixed pulley section 104 by a spring 108, and the spring is guided by a sleeve 109 on shaft 50 and engaging the rear wall of the housing 103.

As the right hand drive pulley section 70 of the main variable speed unit V is moved closer to the dual fixed pulley section 62, the V-belt 90 will climb radially outwardly between pulley sections 62 and 70. In the right hand follower unit R, the spring 98 will permit the movable or follower pulley section 95 to move away from the fixed pulley section 94. This action increases the speed of the output shaft 40, relative to that of the power shaft 34.

Conversely, in the left hand follower unit L, when the movable pulley section 80 of the main variable speed unit V is moved away from the dual fixed pulley section 62, the action of spring 108 on the movable pulley section 105 will cause the belt 92 to climb outwardly in the left hand follower unit L, and inwardly in the main variable speed unit V. This decreases the speed of the output shaft 50 for the left hand wheels relative to the speed of the power shaft 34.

From the above description, it can be seen that if the two movable pulley sections 70 and 80 in the main variable speed drive unit V are moved simultaneously along the splines 64 of the power shaft 34, and in the same direction, then the relative speeds of the driven shafts 40 and 50 will change. For example, in the position of the parts illustrated in FIGURE 4, the pulley section 80 for the left hand follower unit L has been moved substantially to its extreme inner position, and the pulley section 70 for the right hand follower unit R has been moved to its extreme outer position. Under these circumstances, the output shaft 40 for driving the right hand wheels is being driven at its minimum speed, whereas the shaft 50 for driving the left hand wheels is being driven at its maximum speed. This will cause the vehicle to turn to the right, for obvious reasons.

It can also be seen referring to FIGURE 3, for example, that a speed change can be obtained without steering the vehicle. In FIGURE 3, the two V-belts 90 and 92 respectively are at approximately their mid-positions, and hence are driving the output shafts 40 and 50 at the same speed. If both the pulley sections 70 and 80 were to be moved simultaneously toward one another by equal increments, then the speed of both output shafts 40 and 50 would increase simultaneously by equal increments, and the vehicle would run faster. The converse action would take place if both pulley sections 70 and 80 were to be moved farther apart from the dual fixed section 62. In the latter case, the speed of the driving wheels on both sides of the vehicle would be simultaneously decreased by equal increments.

The control assembly C for the variable speed driving unit V is operated by a single control lever or joystick 108, and is designed to cause the vehicle to respond to motion of the control lever 108 in a manner that is psychologically meaningful. Stated differently, if the control lever 108 is advanced forwardly, the vehicle speed increases; and if the lever 108 is retracted, the vehicle is slowed down. If the control lever 108 is moved to the left, the vehicle turns left, and if the control lever is moved right, the vehicle turns right.

The manner in which the single control lever 108 provides a psychologically meaningful control, in connection with the variable speed drive unit of the present invention, is best seen in FIGURES 3 and 5. Mounted forwardly of the operator's seat S is a high lead, double pitch nut 110 which is secured to the frame 10 of the vehicle. The nut 110 has a left hand thread. Turning within the nut 110 is a double pitch screw 112, having a rearwardly projecting extension, or stub shaft portion 113. The joystick or single control lever 108 (FIGURE 5) is formed with a yoke 116, which yoke surrounds the shaft portion 113 of the screw 112. The yoke 116 of the control lever is rockably mounted on the screw shaft 113 by means of a pin 118, retained by opposed collars 119. As mentioned, screw 112 is of left hand pitch, so that rotating the control lever 108 to the left causes the screw 112 and its shaft 113 to move forwardly, and vice versa.

The connections between the control lever 108 and the shift levers 74 and 84 of the main variable speed drive unit V are link assemblies. The link assembly for the shift lever 74, that controls the right follower hand unit R, is indicated generally at 120. It includes a rearward section 120a, and a forward section 120b. The rearward end of the rearward control lever section 120a is threaded, and mounts opposed self aligning blocks or washers 121, which blocks fit the sockets 79 formed in the lower end of the control lever, previously referred to. The blocks 121 are locked in position on the control lever assembly 120 by means of nuts 122.

At the control lever 108, self aligning blocks 123 are received in sockets 123a formed in the control lever, and the adjusted position of the blocks 123 is maintained by lock nuts 124.

Means are provided so that the control lever or joystick 108 can be positioned before the vehicle starts; that is, before it is moving. This is made possible by relief spring assemblies A in linkages 120 and 130. The relief spring assembly A in linkage 120 includes a spring housing 125, connected to the forward end of the rearward section 120a of the control linkage. A washer or plunger 126 is mounted on the rearward end of the forward section 120b of the control lever linkage 120. The forward end of the relief spring housing 125 is closed by a retainer cap 127, which retains forward and rearward compression springs 128, 129 respectively. It can be seen that this arrangement provides control, while permitting preliminary adjustment of the control lever or joystick, when the motor is not turning the pulleys in the main variable speed unit V.

The control assembly for the shift lever 84 that controls the left side follower unit L is similarly arranged. The assembly includes a control linkage bearing reference characters 130–134, which parts correspond to the parts 120–124 for the right hand control assembly, and so are not to be described in detail. As mentioned, a spring relief assembly A is mounted in the linkage 130. As seen in FIGURE 3, the rearward section 120a of the control assembly 120 is bent at 135, in order to clear the shift lever 84 for the left hand follower unit L.

In operation, if the control lever 108 is moved forwardly by the operator, and if the vehicle is running, movable pulley section 70 of the main unit V is brought closer to the dual fixed pulley section 62 by the right hand control linkage 120. Because of the disposition of the connection of the left hand control linkage 130 to the control lever 108, the movable pulley section 80 for the left hand drive unit is simultaneously brought closer to the dual fixed pulley section 62, in the unit V. As previously described, this forward motion of the control lever will cause the vehicle to speed up. Pulling the control lever back from its neutral position, results in separation of pulley sections 70 and 80, with a corresponding decrease in vehicle speed.

If the control lever 108 is moved to the right by the operator, the left hand pitch screw 12 turns in its nut 110, and both control linkage assemblies 120 and 130 are moved rearwardly, as they are viewed in FIGURES 3 and 4. This moves the pulley section 80 for the left hand follower unit closer to the dual fixed pulley section 62 in the main unit V, and simultaneously moves the pulley section 70 for the right hand follower unit farther from the dual fixed pulley section 62, in the main section V. The result of this rightward motion of the control lever 108 is that the output or driven shaft 50 for the left hand follower unit L turns faster than does the driven shaft 40 for the right follower unit R, and the vehicle turns right.

If the operator moves the control lever 108 to his left, both pulley sections 70 and 80 are shifted simultaneously, but in the forward direction. This causes the output shaft 40 of the right hand follower unit R to turn faster than does the output shaft 50 of the left hand follower unit L, and the vehicle will therefore turn to the left.

FIGURES 7–9 illustrate another embodiment of the invention. This vehicle has the same general mode of operation as that just described, except that two lead screws are required at the main variable speed unit V1, and the parts are differently oriented on the chassis. The frame and wheel mounting assemblies of the vehicle of this embodiment of the invention are like those previously described, and a description thereof will not be repeated.

As seen in FIGURE 7, the output shaft 140 for the right hand driven or follower unit R (which unit is like that previously described) now extends to the right from the unit R. The outboard end of the shaft 140 is supported in a bearing 141, and a sprocket 142 is mounted on the shaft. The sprocket 142 drives a chain 144 which enters a speed reducer box 146, the internal details of which are not important to the invention, and hence are not illustrated. The output shaft of the gear reducer box 146 is an axle shaft 18, which drives the associated wheel 20 and the sprocket 22 for driving the other wheel, in the manner previously described.

The output shaft 150 of the left hand driven or follower unit L operates corresponding parts, which are given the reference characters 151 to 156 and since these parts are essentially duplicates of those for the right hand unit R, they will not be discussed in detail.

In the embodiment of the invention now being described, right and left hand shift levers 160 and 170 respectively, are provided for movable pulley sections 70 and 80 in the main unit V1, which pulley sections are like those previously described. The shift lever 160 is mounted on a shifting collar 162 for pulley section 70, by means of a close fitting yoke 164, but the hub and bearing arrangement for the movable pulley section 70 is otherwise like that in the embodiment previously described.

At the lower end of the shift lever 160 for the right hand follow unit R, is a right hand pitch nut 166, of a high lead, double pitch construction. The nut 166 receives a screw 168, formed on a control shaft 169. Similarly, a collar 172 and a yoke 174 mount a shift lever 170 on the movable pulley section 80 for controlling the left hand follower unit L. A nut 176 is mounted on the lower end of the shift lever 170, but in this case the nut is a left hand nut, and fits a high lead double pitch left hand screw 178, formed on the control shaft 169. The control shaft 169 is rotatably and slidably mounted in bearings 180, 182, which bearings are bolted to the frame 10.

The control lever or joystick for operating this form of the invention forms part of a modified control assembly C1, and is indicated generally at 184. The control lever 184 includes a yoke 186 (FIGURE 9) which is mounted on a pin 188 that extends through the control shaft 169. Collars 190 hold the pin 188 in place on the control shaft 169. The control lever 184 has a lower projection or extension 192 (FIGURES 8 and 9), which terminates in a cam disc 194. The cam disc 194 can be oscillated between, but is axially restrained by, opposed cam plates 196.

In operation, motion of the control lever 184 in a forward direction, as viewed from the operator's seat S (FIGURE 9), turns the control shaft 169, and the right and left hand screws 168, 178 formed thereon, in a counterclockwise direction as the end of the control shaft is viewed in FIGURE 9. This causes the shift levers 160 and 170, and their associated pulley sections 70 and 80 in the main unit V1, to move towards the fixed dual pulley section 62 by equal increments. This forward motion of the control lever 184 increases the speed of the vehicle. Rearward motion of the control lever 184; that is, motion towards the operator's seat S as it is seen in FIGURE 9, causes the shift levers 160 and 170, and their associated pulley sections 70 and 80 in the main unit V1 to separate from the fixed dual pulley section 62 by equal increments, which decreases the speed of the vehicle.

If the control lever 184 is moved to the left, as it is viewed from the operators position, and as it is seen in FIGURE 8, the resulting rotation of the control shaft 169 will cause both nuts 166 and 176 to be shifted to the left, simultaneously, and by equal increments. This will increase the speed of the drive to the right hand follower unit R, and will decrease the speed of the drive to the left hand follower unit L, and the vehicle will turn left. Similarly, motion of the control lever 184 to the right, as it is viewed in FIGURE 8, will cause the opposite action to take place, and the vehicle will turn right.

As mentioned, the control apparatus of the present invention can be employed on vehicles having ground wheels, as illustrated, or on caterpillar or track laying drive wheels. In the latter case, only the forward driving sprockets 22 would be required, and these sprockets would be connected to the forward track driving sprockets in the conventional manner. In either case, the steering action characteristic of the vehicle of the present invention can be characterized as "variable ratio differential steering."

Thus it can be seen that both embodiments of the present invention provide a combined variable speed and steer control using a single control lever or joystick, and the motion of the control level is psychologically meaningful.

Having completed a detailed description of the invention so that those skilled in the art may practice the same, I claim:

1. A variable speed and steer control apparatus for a vehicle comprising a frame, a main variable speed drive unit mounted on said frame, said unit including a power shaft, a dual belt pulley section fixed to said power shaft, opposed power transmission belt movable pulley sections keyed to and slidable along said power shaft and located on opposite sides of said dual pulley section, right and left power transmission belt follower units supported by said frame, a power transmission belt between said main unit and each follower unit, a control lever, means mounting said control lever on said frame for universal fore and aft and right and left motion, means for connecting said control lever to said opposed power transmission belt movable pulley sections for simultaneously moving said opposed sections toward and away from each other when the control lever is rocked in one plane, and means connecting said control lever to said opposed power transmission belt movable pulley sections for simultaneously shifting both of said opposed sections along the power shaft to move the pulley section for the right follower unit closer to, and the pulley section for the left follower section farther from, said dual fixed pulley section when the control lever is moved in one direction in a plane normal to said one plane thereby turning the vehicle in one direction, and vice versa when the control lever is moved in the other direction in said normal plane to turn the vehicle in a direction opposite said one turning direction.

2. The apparatus of claim 1, wherein said control lever mounting means comprises a screw and nut assembly with means for mounting one element of the assembly on said frame for relative rotation about an axis generally parallel to that of said power shaft, and pivot means mounting said control lever on the rotatable one of said screw and nut elements for oscillation about an axis normal to the axis of rotation of the element.

3. The apparatus of claim 2, wherein said means for connecting the control lever to said opposed power transmission belt sections comprises first link means connected between said control lever at one side of said control lever pivot means and one of said transmission belt pulley sections, and second link means connected between said control lever at the other side of said control lever pivot means and the other of said transmission belt pulley sections.

4. The apparatus of claim 3, wherein said screw and nut assembly has a left hand pitch, said first link means connects to said control lever above the control lever pivot means, and to the transmission belt pulley section that drives the left hand follower unit; and said second link means connects to said control lever below the control lever pivot means, and to the transmission belt pulley section that drives the right hand follower unit.

5. The apparatus of claim 1, wherein said means for connecting the control lever to each of said transmission belt pulley sections includes a link assembly, and double acting spring relief means in each link assembly.

6. The apparatus of claim 1, wherein said control lever mounting means comprises a control shaft rotatably and slidably mounted on said frame for motion about an axis generally parallel to that of said power shaft, pivot means for mounting said control lever on said control shaft for oscillation about an axis normal to that of the control shaft, and cam means between said control lever and said frame for axially shifting said control shaft in response to oscillation of the control lever about its pivot means; and said means for connecting the control lever to said opposed transmission belt pulley sections comprises a first screw and nut assembly of one hand, with one element of the assembly connected to rotate with said control shaft and the other element being connected for axially shifting one of said transmission belt pulley sections, and a second screw and nut assembly of the opposite hand for axially shifting the other of said transmission belt pulley sections.

7. The apparatus of claim 6, wherein said first screw and nut assembly has a left hand thread and is connected to shift the belt section that drives the left transmission belt follower unit.

8. The apparatus of claim 7, wherein said power and control shafts are mounted transversely of said frame.

9. The apparatus of claim 1, wherein said one plane extends fore and aft of the vehicle.

10. A variable speed and steer control apparatus for a vehicle comprising a frame, a main variable speed drive unit mounted on said frame, said unit including a power shaft, a dual belt pulley section fixed to said power shaft, opposed power transmission belt movable pulley sections keyed to and slidable along said power shaft and located on opposite sides of said dual pulley section, right and left power transmission belt follower units supported by said frame, a power transmission belt between said main unit and each follower unit, a control lever, means mounting said control lever on said frame for universal fore and aft and right and left motion, means for connecting said control lever to said opposed power transmission belt sections for simultaneously moving said opposed sections toward and away from each other when the control lever is rocked in the fore and aft directions, respectively, and means connecting said control lever to said opposed movable belt pulley sections for simultaneously shifting both of said opposed movable pulley sections along the power shaft to move the section for the right follower unit closer to and the section for the left follower section farther from said dual fixed section when the control lever is moved toward the right side of said frame, and vice versa when the control lever is moved toward the left side of said frame and thereby effect turning of the vehicle.

11. A driven wheel steered vehicle comprising a frame, an engine on said frame, a main variable speed drive unit having a housing mounted on said frame, a power shaft driven by said engine and extending into said housing, a dual belt pulley section fixed to said power shaft, opposed power transmission movable belt pulley sections keyed to and slidable along said power shaft and located on opposite sides of said dual pulley section, right and left power transmission belt follower units supported by said frame, a power transmission belt between said main unit and each follower unit, a control lever, a seat on said frame behind said control lever, means mounting said control lever on said vehicle frame for universal fore and aft and right and left motion, means for connecting said control lever to said opposed power transmission movable belt pulley sections for simultaneously moving said opposed pulley sections toward and away from each other when the control lever is rocked in the fore and aft directions, respectively, and means connecting said control lever to said opposed power transmission movable belt pulley sections for simultaneously shifting both of said opposed pulley sections along the shaft to move the pulley section for the right follower unit closer to, and the pulley section for the left follower section farther from, said dual fixed pulley section when the control lever is moved toward the right side of said frame, and vice versa when the control lever is moved toward the left side of said frame to effect steering of the vehicle.

References Cited by the Examiner
UNITED STATES PATENTS

| | | | |
|---|---|---|---|
| 1,278,256 | 9/1918 | Thompson | 180—6.7 X |
| 2,393,324 | 1/1946 | Joy. | |
| 2,565,293 | 8/1951 | Aydelott et al. | |
| 2,882,753 | 4/1959 | Pakosh | 180—6.2 X |
| 2,924,993 | 2/1960 | White | 180—6.66 X |

FOREIGN PATENTS 940,347  10/1963  Great Britain.

References Cited by the Applicant
UNITED STATES PATENTS

| | | |
|---|---|---|
| 2,532,762 | 12/1950 | Deletaille. |
| 2,595,229 | 5/1952 | Curtis. |
| 2,637,215 | 5/1953 | Rieser. |
| 2,952,167 | 9/1960 | Nelson. |

BENJAMIN HERSH, *Primary Examiner.*

J. A. PEKAR, *Assistant Examiner.*